US011066952B2

(12) United States Patent
Hanlon et al.

(10) Patent No.: US 11,066,952 B2
(45) Date of Patent: Jul. 20, 2021

(54) GREEN REPAIR OF OXIDATION AND CORROSION RESISTANT COATINGS

(71) Applicant: UNITED TECHNOLOGIES CORPORATION, Farmington, CT (US)

(72) Inventors: Thomas R. Hanlon, Colchester, CT (US); Jeffrey Leon, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 309 days.

(21) Appl. No.: 15/601,271

(22) Filed: May 22, 2017

(65) Prior Publication Data

US 2018/0334925 A1 Nov. 22, 2018

(51) Int. Cl.
*F01D 25/00* (2006.01)
*C23F 11/00* (2006.01)
*C23C 24/04* (2006.01)
*F01D 5/28* (2006.01)
*C23C 26/00* (2006.01)
(Continued)

(52) U.S. Cl.
CPC .............. *F01D 25/007* (2013.01); *C21D 7/08* (2013.01); *C23C 24/04* (2013.01); *C23C 26/00* (2013.01); *C23F 11/00* (2013.01); *F01D 5/005* (2013.01); *F01D 5/288* (2013.01); *F01D 25/005* (2013.01); *B23P 9/02* (2013.01); *F05D 2220/32* (2013.01); *F05D 2230/80* (2013.01); *F05D 2240/30* (2013.01); *F05D 2240/60* (2013.01); *F05D 2300/11* (2013.01); *F05D 2300/121* (2013.01); *F05D 2300/132* (2013.01); *F05D 2300/22* (2013.01); *F05D 2300/611* (2013.01)

(58) Field of Classification Search
CPC .......... B05D 1/12; B32B 15/02; C23C 10/18; B22F 7/06; F01D 25/007
See application file for complete search history.

(56) References Cited

U.S. PATENT DOCUMENTS 5,409,781 A * 4/1995 Rosler ................. B22F 5/04
428/547
6,395,406 B1 5/2002 Sangeeta
(Continued)

FOREIGN PATENT DOCUMENTS

WO 2004033116 4/2004

OTHER PUBLICATIONS

Gurrappa et al., The Importance of Hot Corrosion and Its Effective Prevention for Enhanced Efficiency of Gas Turbines, Feb. 25, 2015, Gas Turbines-Materials Modeling and Performance, pp. 56-102.*
(Continued)

*Primary Examiner* — Dah-Wei D. Yuan
*Assistant Examiner* — Andrew J Bowman
(74) *Attorney, Agent, or Firm* — Snell & Wilmer L.L.P.

(57) ABSTRACT

A repaired oxidation and corrosion resistant coating may comprise a repair material applied to a damaged portion of the oxidation and corrosion resistant coating. The repair material may be free of hexavalent chromium and may be compatible with a plurality of oxidation and corrosion resistant materials that comprise hexavalent chromium. The repair material may be burnished. The oxidation and corrosion resistant coating may comprise hexavalent chromium.

13 Claims, 6 Drawing Sheets

(51) Int. Cl.
    *C21D 7/08*           (2006.01)
    *F01D 5/00*          (2006.01)
    *B23P 9/02*          (2006.01)

(56) References Cited

U.S. PATENT DOCUMENTS

| | | | |
|---|---|---|---|
| 6,485,780 B1 * | 11/2002 | Sangeeta | ........... C23C 10/02 |
| | | | 29/889.1 |
| 9,322,101 B2 | 4/2016 | Belov et al. | |
| 9,394,448 B2 | 7/2016 | Belov et al. | |

OTHER PUBLICATIONS

European Patent Office, European Search Report dated Oct. 17, 2018 in Application No. 18172003.8.
European Patent Office, European Office Action dated Jun. 26, 2019 in Application No. 18172003.8.

* cited by examiner

GREEN REPAIR OF OXIDATION AND CORROSION RESISTANT COATINGS

FIELD

The present disclosure relates generally to repairing aircraft parts, and more specifically, to repairing damaged portions of oxidation and corrosion resistant coatings.

BACKGROUND

Metals which may be prone to oxidation and/or corrosion, for example, steel and aluminum, are frequently used in aerospace applications, such as in aircraft engines and parts. To prevent oxidation and corrosion, these parts may be coated with an oxidation and corrosion resistant compound. A variety of oxidation and corrosion resistant coatings are commercially available for use; however, many of these oxidation and corrosion resistant coatings may be associated with a specific repair material. Thus, when a part's oxidation and corrosion resistant coating is damaged or in need of repair, the particular type of oxidation and corrosion resistant coating may need to be determined and the repair material specific to that type of oxidation and corrosion resistant coating obtained before any repair of the coating can be performed.

Further, environmental concerns and/or regulations may preclude the use of hexavalent chromium ("Cr(VI)") or other materials of concern in oxidation and corrosion resistant coatings and/or in the repair materials for oxidation and corrosion resistant coatings. Thus, repair materials specific to older oxidation and corrosion resistant coatings may no longer be desirable and/or may not conform to environmental regulations.

SUMMARY

A method for repairing an oxidation and corrosion resistant coating is disclosed in accordance with various embodiments. A method for repairing an oxidation and corrosion resistant coating may comprise applying a first coat of a repair material to a damaged portion of the oxidation and corrosion resistant coating, and burnishing the repair material. The repair material may comprise, in weight percent, about 43% aluminum powder, about 47% water, and about 10% metal silicates.

In various embodiments, the method may further comprise applying a second coat of the repair material to the damaged portion of the oxidation and corrosion resistant coating. The burnishing the repair material may be performed after applying the second coat of the repair material. The oxidation and corrosion resistant coating may comprise hexavalent chromium. The oxidation and corrosion resistant coating may be disposed on a surface of a metallic component. The metallic component may comprise a ferrous metal. A thickness of the first coat of the repair material may be between 0.0001 inches and 0.002 inches. In various embodiments, the method may further comprise testing a resistivity of the repair material.

In various embodiments, the oxidation and corrosion resistant coating may comprise at least one of a first material comprised of, by weight percent, about 37% to 46% water, about 14% to 18% phosphoric acid and reaction products with aluminum hydroxide and chromium oxide (CrO3), and about 40% to 45% uncoated aluminum powder, a second material, different from the first material and comprised of, by weight percent, about 30% to 50% aluminum powder, about 10% to 20% phosphoric acid, about 5% or less chromium (VI) trioxide, and about 1% or less chromium hydroxide; or a third material different from the first material and the second material and comprised of, by weight percent, about 40% to 50% aluminum, about 10% to 20% phosphoric acid and reaction products of aluminum hydroxide and chromium oxide (CrO3), and about 40% to 50% water.

In accordance with various embodiments, a method for repairing an oxidation and corrosion resistant coating of a turbine engine component may comprise identifying a damaged portion of the oxidation and corrosion resistant coating, applying a first coat of a repair material to the damaged portion of the oxidation and corrosion resistant coating, and burnishing the repair material. The damaged portion of the oxidation and corrosion resistant coating may expose a metallic surface of the turbine engine component. The repair material may comprise, in weight percent, about 43% aluminum powder, about 47% water, and about 10% metal silicates.

In various embodiments, the oxidation and corrosion resistant coating may comprise hexavalent chromium. The turbine engine component may comprise a ferrous metal. In various embodiments, the method may further comprise grit blasting the damaged portion of the oxidation and corrosion resistant coating. After the burnishing of the repair material, a resistivity of the repair material may be 10 ohms or less. The method may further comprise applying a second coat of the repair material. A thickness of the first coat of the repair material may between 0.0001 inches and 0.002 inches. A thickness of the second coat of the repair material may be between 0.0001 inches and 0.002 inches.

A turbine engine component may comprise an oxidation and corrosion resistant coating disposed on a surface of the turbine engine component. An opening in the oxidation and corrosion resistant coating may expose a metallic portion of the turbine engine component. A repair material may be disposed in the opening in the oxidation and corrosion resistant coating. The repair material may comprise, in weight percent, about 43% aluminum powder, about 47% water, and about 10% metal silicates.

In various embodiments, a thickness of the repair material may be less than a thickness of the oxidation and corrosion resistant coating. The oxidation and corrosion resistant coating may comprise hexavalent chromium. A resistivity of the repair material may be 10 ohms or less.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

In various embodiments of the present disclosure, methods for coating and/or repairing an oxidation and corrosion resistant coating are described. The described methods for coating and/or repairing may be used with both oxidation and corrosion resistant coatings that contain Cr(VI) and oxidation and corrosion resistant coatings that are free or substantially free of Cr(VI).

Figure 1:
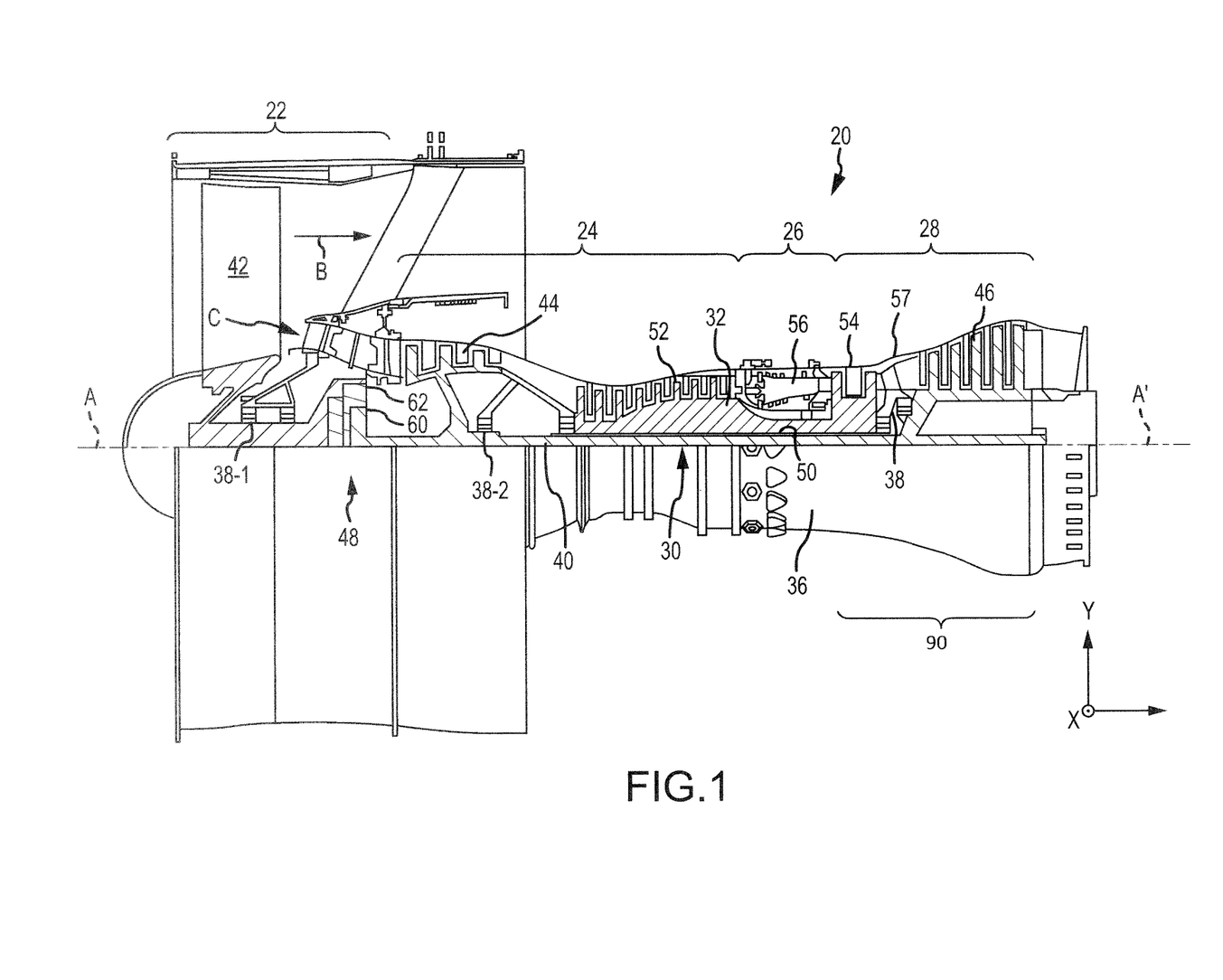
FIG. 1 illustrates a gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a path of bypass airflow B while compressor section 24 can drive coolant along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
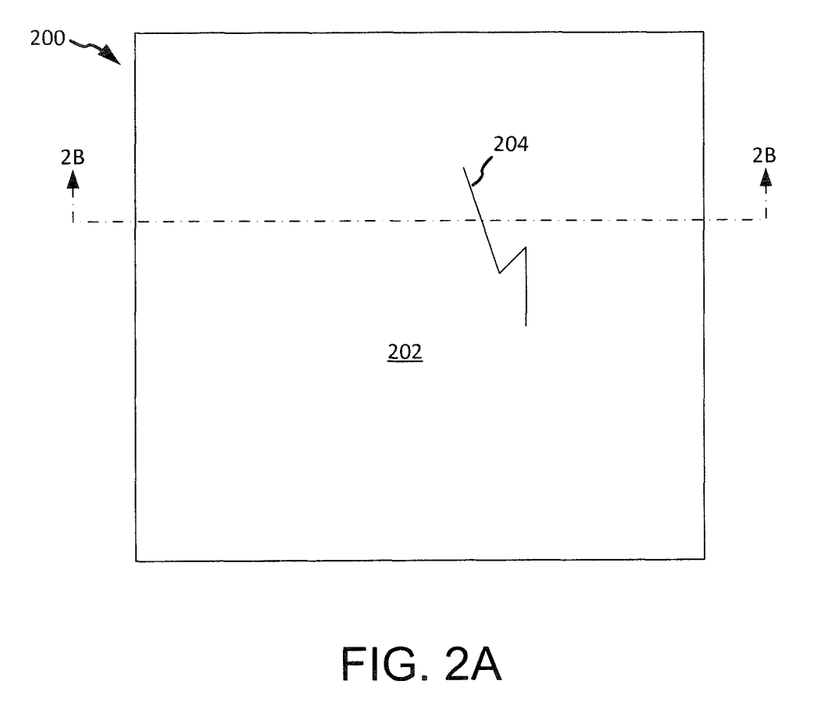
FIGS. 2A and 2B illustrate a gas turbine engine part having a damaged oxidation and corrosion resistant coating, in accordance with various embodiments.

With reference to FIG. 2A, a segment or a portion of an aircraft part 200 having an oxidation and corrosion resistant coating 202 (also referred to herein as a base coating) is illustrated, in accordance with various embodiments. In various embodiments, part 200 may be a part of gas turbine engine 20 (FIG. 1). For example, part 200 may be a high pressure turbine shaft, a low pressure turbine shaft, an airfoil, a fan blade, a hub, etc. In various embodiments, part 200 may be a part outside of gas turbine engine 20. For example, part 200 may be a brake component or a landing gear part. Part 200 may be any metal aircraft part which is susceptible to oxidation and/or corrosion and which may benefit from an oxidation and corrosion resistant coating.

Figure 2B:
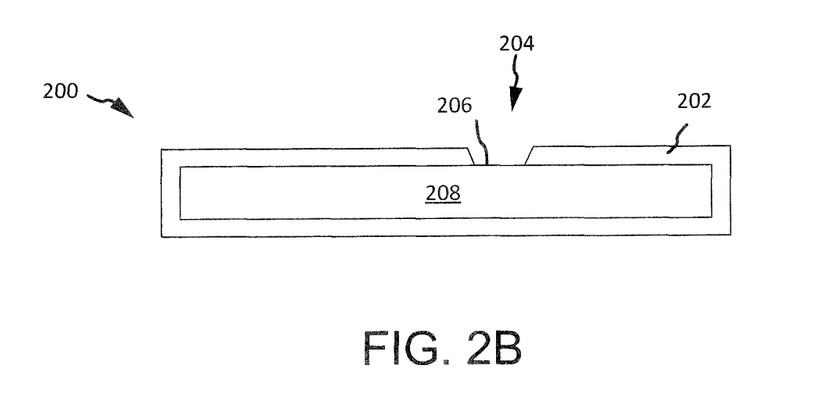

FIG. 2B shows a cross-sectional view of part 200 taken along the line 2B-2B in FIG. 2A. Part 200 may comprise a metal substrate 208 comprised of, for example, steel or aluminum. In various embodiments, metal substrate 208 comprises a ferrous metal. Metal substrate 208 may be coated with base coating 202. In various embodiments, base coating 202 may comprise an oxidation and corrosion resistant material that includes Cr(VI). In various embodiments, base coating 202 may comprise an oxidation and corrosion resistant material which does not include Cr(VI).

Base coating 202 may comprise a damaged portion 204. Damaged portion 204 may expose a surface 206 of metal substrate 208. In various embodiments, damaged portion 204 may be a portion of base coating 202 that is scratched, eroded, abraded, worn, or otherwise damaged. Damaged portion 204 may comprise an opening in base coating 202 that exposes metal substrate 208, though in various embodiments damaged portion 204 does not expose metal substrate 208. Damaged portion 204 may make part 200 susceptible to further damage including oxidation, corrosion, cracking, breaking, or other damage that may lead to failure of part 200.

Figure 3A:
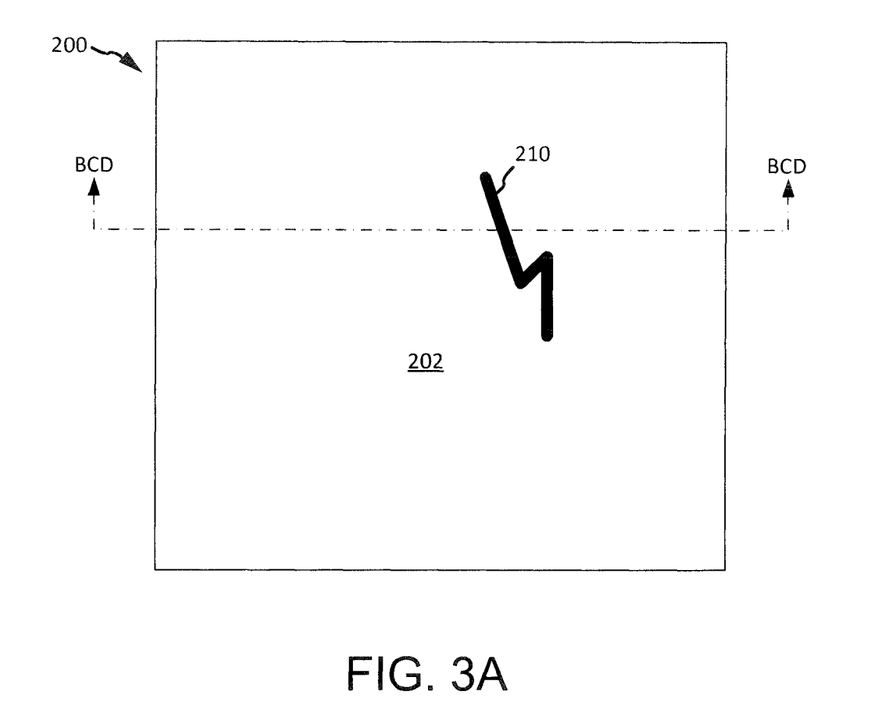
FIG. 3A, illustrates a gas turbine engine part having a repaired oxidation and corrosion resistant coating, in accordance with various embodiments.
Figure 3B:
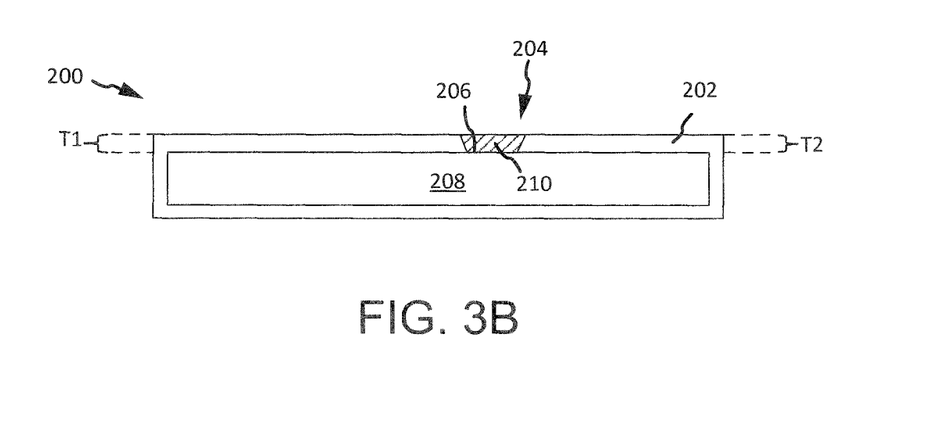
FIGS. 3B, 3C, and 3D illustrate a cross-sectional views of a gas turbine engine part having a repaired oxidation and corrosion resistant coating, in accordance with various embodiments.
Figure 3C:
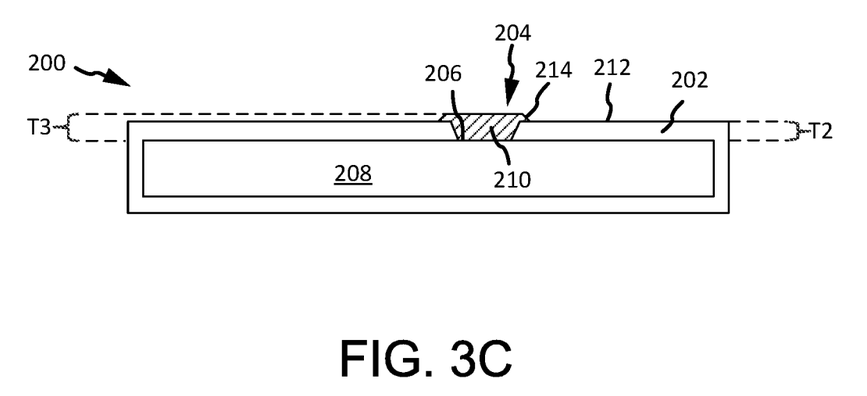
Figure 3D:
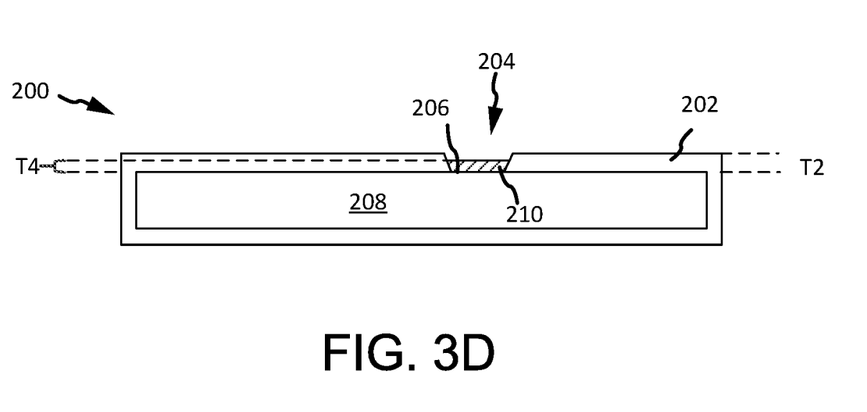

With reference to FIGS. 3A, 3B, 3C, and 3D, aircraft part 200 having a repaired base coating 202 is illustrated, in accordance with various embodiments. FIGS. 3B, 3C, and 3D illustrate a cross sectional view of part 200 taken along the line BCD-BCD in FIG. 3A. In accordance with various embodiments, damaged portion 204 of base coating 202 may be repaired by replacing the eroded or lost material with a repair material 210 (also referred to herein as a repair coating). In various embodiments, repair material 210 comprises an oxidation and corrosion resistant paint or sealant that does not include Cr(VI) (i.e., a "chromate-free" material). For example, a suitable chromate-free repair material 210 comprises, in weight percent, about 43% aluminum powder (CAS No. 7429-90-5), about 47% water (CAS No. 7732-18-5), and about 10% metal silicates (1344-09-08), and is available from Coating For Industry, Inc., 319 Township Line Road, Souderton, Pa. (U.S.A.) under the tradename ALSEAL® 5K. As used herein, the term "about" means±2.0%.

Repair material 210 may be applied to damaged portion 204 of base coating 202 by brushing, spraying, painting, or any other suitable application method. Repair material 210 may be applied and used to repair multiple types of base coating 202. For example, repair material 210, comprising a chromate-free material, demonstrates a compatibility with base coatings 202 that are chromate-free and an unexpected compatibility with base coatings 202 that include Cr(VI).

In various embodiments, base coating 202 may be include Cr(VI) and may be repaired with chromate-free repair material 210 and may exhibit the same corrosion resistance and/or structural properties as an undamaged base coating 202 and/or a base coating 202 repaired with a repair material comprising Cr(VI). For example, part 200 may be coated with a base coating 202 comprised of, by weight percent, about 37% to 46% water (CAS No. 7732-18-5), about 14% to 18% phosphoric acid-reaction products with aluminum hydroxide and chromium oxide (CrO3) (CAS No. 92203-02-6), and about 40% to 55% uncoated aluminum powder (CAS No. 7429-90-5). As used herein, the term "about" means±2.0%. The base coating 202 may be repaired with a repair material 210 comprising, in weight percent, about 43% aluminum powder (CAS No. 7429-90-5), about 47% water (CAS No. 7732-18-5), and about 10% metal silicates (CAS No. 1344-09-08). The repaired base coating 202 may exhibit the same corrosion resistance and/or structural properties as an undamaged base coating 202 and/or a base coating 202 repaired with a repair material comprising Cr(VI). In various embodiments, structural properties may include corrosion resistance, oxidation resistance, fatigue life, color match, strength, toughness, ductility, and/or durability. In various embodiments, structural properties may include yield strength, ultimate strength, Young's modulus, and/or Poisson's ratio.

In various embodiments, base coating 202 may be comprised of, by weight percent, about 20% to 40% aluminum (CAS No. 91728-14-2), about 10% to 20% phosphoric acid (CAS No. 7664-38-2), about 5% or less chromium (VI) trioxide (CAS No. 1333-82-0), and about 1% or less chromium hydroxide (CAS No. 1308-14-01), and may be repaired with chromate-free repair material 210, as described above. As used herein, the term "about" means±2.0%. The repaired base coating 202 may exhibit the same corrosion resistance and/or structural properties as an undamaged base coating 202 and/or a base coating 202 repaired with a repair material comprising Cr(VI). In various embodiments, structural properties may include corrosion resistance, oxidation resistance, fatigue life, color match, strength, toughness, ductility, and/or durability. In various embodiments, structural properties may include yield strength, ultimate strength. Young's modulus, and/or Poisson's ratio.

In various embodiments, base coating 202 may be comprised of, by weight percent, about 40% to 50%, about aluminum (CAS No. 91728-14-2), about 10% to 20% phosphoric acid and reaction products of aluminum hydroxide and chromium oxide (CrO3) (CAS No. 92203-02-6), and about 40% to 50% water (CAS No. 7732-18-5), and may be repaired with chromate-free repair material 210, as described above. As used herein, the term "about" means±2.0%. The repaired base coating 202 may exhibit the same corrosion resistance and/or structural properties as an undamaged base coating 202 and/or a base coating 202 repaired with a repair material comprising Cr(VI). In various embodiments, structural properties may include corrosion resistance, oxidation resistance, fatigue life, color match, strength, toughness, ductility, and/or durability. In various embodiments, structural properties may include yield strength, ultimate strength, Young's modulus, and/or Poisson's ratio.

In accordance with various embodiments, accelerated oxidation and corrosion testing was performed on six sets of steel substrates, each set of steel substrate having a different oxidation and corrosion resistant coating. Five of the six sets of steel substrate were coated with oxidation and corrosion resistant coatings that included an aluminum ceramic compound containing Cr(VI). One of the six sets of steel substrates was coated with oxidation and corrosion resistant coatings that did not include an aluminum ceramic compound containing Cr(VI).

A first damaged area was formed in each of the oxidation and corrosion resistant coatings. The first damaged area was formed by placing a piece of tape on the steel substrate prior to applying the oxidation and corrosion resistant coating. After applying the oxidation and corrosion resistant coating, the tape was removed to expose the surface of the steel substrate. A second damaged area was formed in each of the oxidation and corrosion resistant coatings by scratching or otherwise cutting through the oxidation and corrosion resistant coating to expose the steel substrate.

The first damaged area and the second damage area were both repaired using a chromate-free repair material comprised of, in weight percent, about 43% aluminum powder (CAS No. 7429-90-5), about 47% water (CAS No. 7732-18-5), and about 10% metal silicates (1344-09-08). An accelerated oxidation and corrosion test, meeting American Society for Testing and Materials (ASTM) B117 test requirements, was then performed by exposing the steel substrates, with repaired oxidation and corrosion resistant coatings, to neutral salt fog conditions that consisted of 5% NaCl at 95° F. (35° C.), in an environment of 95% relative humidity. After 1000 hours of exposure to the neutral salt fog conditions, all substrates remained free of corrosion, demonstrating an unexpected compatibility between the Cr(VI) containing oxidation and corrosion resistant coatings and the chromate-free repair material.

After the 1000 hours of exposure to the neutral salt fog conditions, an adhesion and/or resistance to delamination and/or resistance to cracking of the repair material was tested by bending the substrates around a 1.5 inch (3.81 cm) mandrel. Chromate-free material 210 demonstrated adhesion, resistance to delamination, and resistance to cracking with all oxidation and corrosion resistant coatings.

With reference to FIG. 3B, in various embodiments, repair material 210 may be applied to damaged portion 106 such that a thickness T1 of repair material 210 may be about equal to a thickness T2 of base coating 202; as used herein the phrase "about equal" mean±0.0002 inches (i.e., ±5.1 micrometers (μm)). In various embodiments, T1 may a total thickness of repair material 210 after application of a second coat of repair material 210.

With reference to FIG. 3C, in various embodiments, a thickness T3 of repair material 210 may be greater than the thickness T2 of base coating 202 such that a portion or lip 214 of repair material 210 extends over a surface 212 of base coating 202.

With reference to FIG. 3D, in various embodiments, a thickness T4 of repair material 210 may be less than the thickness T2 of base coating 202 and still provide a viable repair. In various embodiments, repair material 210 does not need to reestablish the thickness T2 of base coating to be compatible with base coating 202. The accelerated corrosion test, as previously described, revealed that repair material 210 provided corrosion protection even when a thickness T4 of repair coating was less than a thickness T2 of base coating 202. A thickness of repair material 210 may selected such that repair material 210 covers exposed surface 206.

Figure 4:
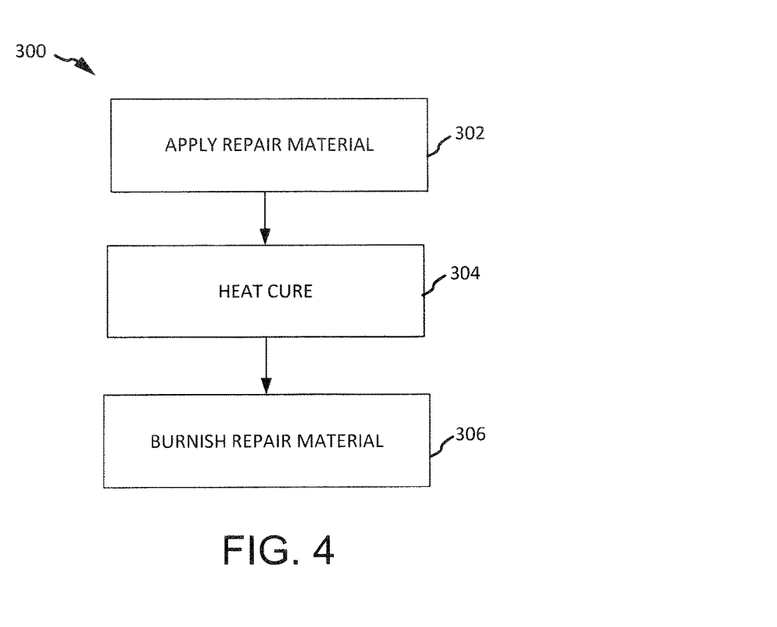
FIGS. 4, 5, and 6 illustrate a method for repairing an oxidation and corrosion resistant coating, in accordance with various embodiments.

FIG. 4 illustrates a method 300 for repairing a damaged oxidation and corrosion resistant coating, in accordance with various embodiments. Method 300 may comprise applying a repair material to a damaged oxidation corrosion resistant coating (step 302). In various embodiments, the repair material comprises, in weight percent, about 43% aluminum powder, about 47% water, and about 10% metal silicates. Method 300 may comprise heat curing the repair material (step 304), and burnishing the repair material (step 306).

In various embodiments, with combined reference to FIG. 4 and FIG. 3B, step 302 of method 300 may comprising applying repair material 210 to damaged portion 204 of oxidation and corrosion resistant coating 202. Repair material 210 may be applied by brushing, rolling, spraying, painting, or any other suitable application method. Repair material 210 may be applied to damaged portion 204 regardless of the Cr(IV) content of base coating 202. In other words, repair material 210 may be used without regard to the identity of the particular type of the material used for base coating 202. Step 304 may include heat curing repair material 210. In various embodiments, the heat curing of repair material 210 may comprise drying repair material 210 at room temperature (e.g., 75° F./23.8° C.) for between 10 minutes and 6 hours, baking part 200 to a metal surface temperature of between 125° F. and 225° F. (i.e., between 51.7° C. and 107.2° C.) for between 10 minutes and 6.5 hours, and heating part 200 to a surface temperature of between 550° F. and 750° F. (i.e., between 287.8° C. and 398.9° C.) for between 20 minutes and 6.5 hours. Step 306 may comprise burnishing repair material 210. Repair material 210 may be burnished to cause repair material 210 to become electrically conductive. In various embodiments, repair material 210 may be burnished by rubbing, polishing, or any other suitable sliding contact. In various embodiments, repair material 210 may be burnished by glass bead peening, or application of aluminum oxide.

Figure 5:
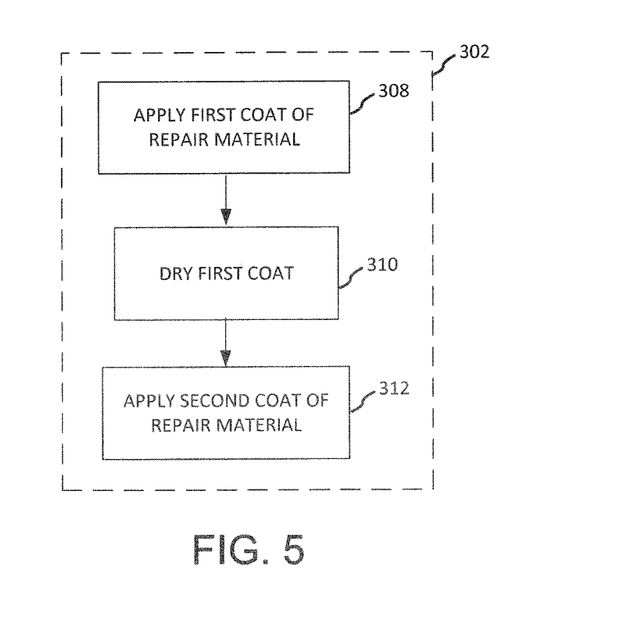

With reference to FIG. 5, in various embodiments, applying the repair material (i.e., step 302 of method 300) may comprise applying a first coat of the repair material (step 308), drying the first coat of the repair material (step 310), and applying a second coat of the repair material (step 312).

In various embodiments, with combined reference to FIG. 3B and FIG. 5, step 308 may comprise applying a first coat of repair material 210. The first coat of repair material 210 may be applied by brushing, rolling, spraying, painting, or any other suitable application method. In various embodiments, a thickness of the first coat of repair material 210 may be between 0.0001 inches and 0.002 inches (i.e., between 2.54 μm and 50.8 μm). In various embodiments, thickness of the first coat of repair material 210 may be between 0.0002 inches and 0.001 inches (i.e., between 5 μm and 25.4 μm).

Step 310 may comprise drying the first coat of repair material. In various embodiments, drying the first coat of repair material 210 may comprise allowing the first coat of repair material 210 to dry at room temperature (e.g., 75° F./23.8° C.) for between 10 minutes and 6 hours. In various embodiments, drying the first coat of repair material 210 may further comprise baking part 200 to a metal surface temperature of between 125° F. and 225° F. (i.e., between 51.7° C. and 107.2° C.) for between 10 minutes and 6.5 hours.

Step 312 may comprise applying a second coat of repair material 210. The second coat of repair material 210 may be applied by brushing, rolling, spraying, painting, or any other suitable application method. In various embodiments, a thickness of the second coat of repair material 210 may be between 0.0001 inches and 0.002 inches (i.e., between 2.54 μm and 50.8 μm). In various embodiments, thickness of the second coat of repair material 210 may be between 0.0002 inches and 0.001 inches (i.e., between 5 μm and 25.4 μm). In various embodiments, after applying the second coat or repair material 210, repair material 210 may be heat cured (step 304), with momentary reference to FIG. 4. In other words, after applying the second coat of repair material 210 the second coat of repair material 210 may be dried at room temperature (e.g., 75° F./23.8° C.) for between 10 minutes and 6 hours, part 200 may then be baked to a metal surface temperature of between 125° F. and 225° F. (i.e., between 51.7° C. and 107.2° C.) for between 10 minutes and 6.5 hours, and the part 200 may be heated to a surface temperature of between 550° F. and 750° F. (i.e., between 287.8° C. and 398.9° C.) for between 20 minutes and 6.5 hours.

Figure 6:
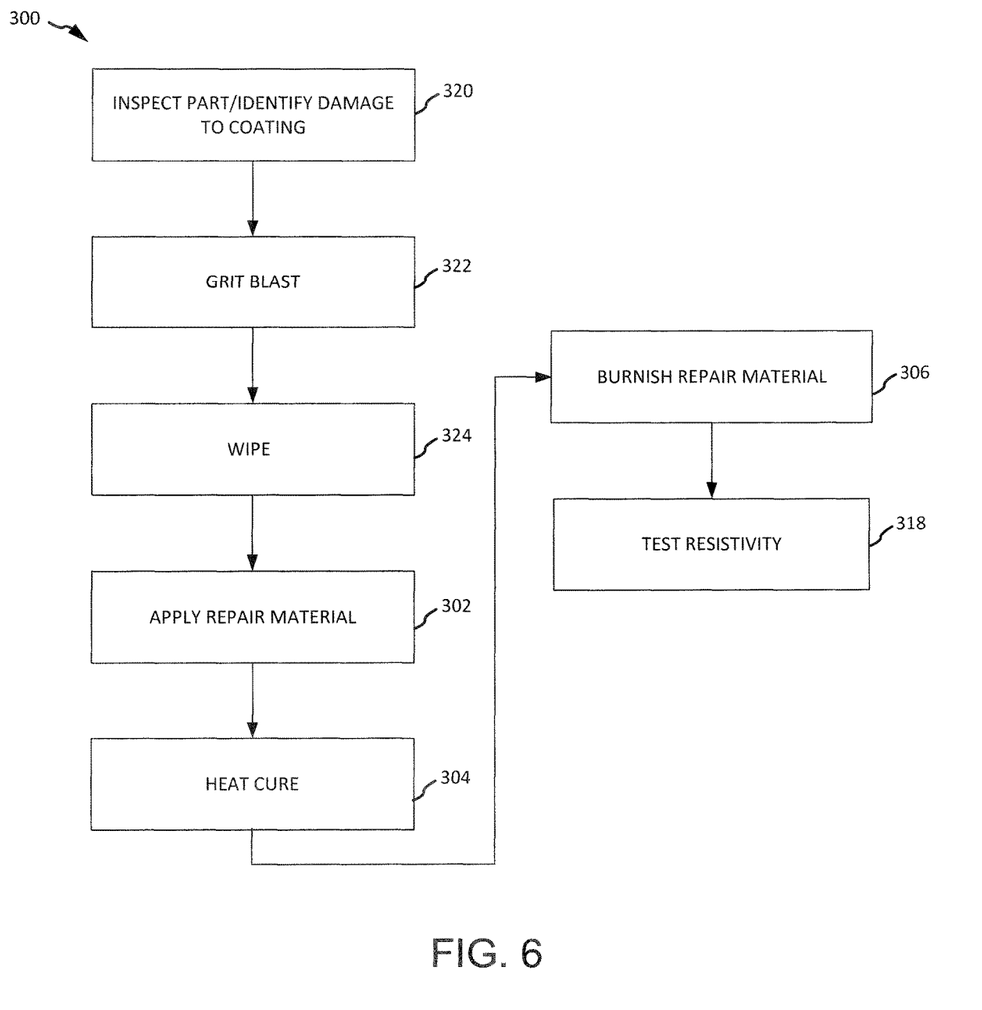

With reference to FIG. 6, in various embodiments, prior to applying the repair material, method 300 may include inspecting a part to identify oxidation and corrosion resistant coating damage (step 320), grit blasting the part and/or damaged area of the oxidation and corrosion resistant coating (step 322), and wiping the part to remove any residue left over the from the grit blast (step 324).

In various embodiments, with combined reference to FIG. 2B, FIG. 3B, and FIG. 6, step 320 may comprise inspecting part 200 and identifying damaged portion 204 in oxidation and corrosion resistant coating 202. Step 322 may comprise grit damaged portion 204 and the portion of surface 206 exposed by damaged portion 204. The grit blasting may remove rust or corrosion that may have begun to accumulate on the portion of surface 206 exposed by damaged portion 204. Grit blasting may be used to roughen or otherwise prepare exposed surface 206 for receiving repair material 210. Step 324 may comprise wiping part 200 to remove any residue left over the from the grit blast. In various embodiments, part 200 may be wiped down by hand.

With reference to FIG. 6, in various embodiments, method 300 may include testing a resistivity of the repair material (step 318). In various embodiments, with combined reference to FIG. 3B and FIG. 6, step 318 may comprise testing a resistivity of repair material 210. The resistivity testing may be performed after burnishing repair material 210. In various embodiments, after burnishing, a resistivity of repair material 210 may be less than 10 ohms. In various embodiments, after burnishing, a resistivity of the repair material 210 may be less than 1 ohm.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for repairing an oxidation and corrosion resistant coating, comprising:
    applying a first coat of a chromate-free repair material to a damaged portion of the oxidation and corrosion resistant coating, wherein the chromate-free repair material comprises, in weight percent, about 43% aluminum powder, about 47% water, and about 10% metal silicates, wherein the damaged portion of the oxidation and corrosion resistant coating exposes a portion of a metallic substrate, and wherein the chromate-free repair material is applied directly to the portion of the metallic substrate;
    heat curing the chromate-free repair material; and
    burnishing the chromate-free repair material, wherein the chromate-free repair material is different from a coating material applied to the metallic substrate to form the oxidation and corrosion resistant coating, and wherein the coating material used to form the oxidation and corrosion resistant coating is at least one of:
    a first material comprised of, by weight percent, about 37% to 46% water, about 14% to 18% phosphoric acid and reaction products with aluminum hydroxide and chromium oxide ($CrO_3$), and about 40% to 45% uncoated aluminum powder;
    a second material, different from the first material, and comprised of, by weight percent, about 30% to 50% aluminum powder, about 10% to 20% phosphoric acid, about 5% or less chromium (VI) trioxide, and about 1% or less chromium hydroxide; or
    a third material, different from the first material and the second material, and comprised of, by weight percent, about 40% to 50% aluminum, about 10% to 20% phosphoric acid and reaction products of aluminum hydroxide and chromium oxide ($CrO_3$), and about 40% to 50% water.

2. The method of claim 1, wherein the coating material used to form the oxidation and corrosion resistant coating comprises hexavalent chromium.

3. The method of claim 1, further comprising applying a second coat of the chromate-free repair material in the damaged portion of the oxidation and corrosion resistant coating.

4. The method of claim 3, wherein the burnishing the chromate-free repair material is performed after the applying the second coat of the chromate-free repair material.

5. The method of claim 1, wherein the metallic substrate comprises a ferrous metal.

6. The method of claim 1, wherein a thickness of the first coat of the chromate-free repair material is between 0.0001 inches and 0.002 inches.

7. The method of claim 1, further comprising testing a resistivity of the chromate-free repair material.

8. A method for repairing an oxidation and corrosion resistant coating on a turbine engine component, comprising:
- identifying a damaged portion of the oxidation and corrosion resistant coating, wherein the damaged portion of the oxidation and corrosion resistant coating exposes a metallic surface of the turbine engine component, and wherein the oxidation and corrosion resistant coating comprises a coating material and wherein the coating material of the oxidation and corrosion resistant coating comprises hexavalent chromium;
- applying a first coat of a chromate-free repair material to the damaged portion of the oxidation and corrosion resistant coating, wherein the chromate-free repair material is applied directly to the metallic surface, and wherein the chromate-free repair material is different from the coating material of the oxidation and corrosion resistant coating, and wherein the chromate-free repair material comprises, in weight percent, about 43% aluminum powder, about 47% water, and about 10% metal silicates;
- heat curing the chromate-free repair material; and
- burnishing the chromate-free repair material.

9. The method of claim 8, wherein the turbine engine component comprises a ferrous metal.

10. The method of claim 8, further comprising grit blasting the damaged portion of the oxidation and corrosion resistant coating.

11. The method of claim 8, wherein after the burnishing of the chromate-free repair material a resistivity of the chromate-free repair material is 10 ohms or less.

12. The method of claim 8, further comprising applying a second coat of the chromate-free repair material.

13. The method of claim 12, wherein:
- a thickness of the first coat of the chromate-free repair material is between 0.0001 inches and 0.002 inches; and
- a thickness of the second coat of the chromate-free repair material is between 0.0001 inches and 0.002 inches.

* * * * *